United States Patent Office 3,023,161
Patented Feb. 27, 1962

3,023,161
REMOVING METAL COMPONENTS FROM
ORGANIC LIQUIDS
John P. Luvisi, Park Ridge, and Joseph A. Chenicek,
Prairie View, Ill., assignors to Universal Oil Products
Company, Des Plaines, Ill., a corporation of Delaware
No Drawing. Filed Aug. 17, 1959, Ser. No. 833,980
4 Claims. (Cl. 208—251)

This invention relates to a novel method of removing metal components from organic liquids. In many instances, organic liquids contain metal components which are detrimental in the subsequent transportation, use or storage of the organic liquids. Accordingly, it is desired to remove the metal component, and the present invention is directed to a novel method for accomplishing this.

One method of refining gasoline is the copper sweetening process, in which process the gasoline is contacted with a copper-containing reagent. As a result of this treatment the sweetened gasoline usually contains small amounts of copper compounds. In addition, gasoline comes in contact with various metals in the course of refining, storing and shipping operations, and this may result in the gasoline containing small amounts of such metals as copper, cobalt, iron, chromium, lead, etc. These metal components appear to catalyze oxidative reactions and, during the transportation and storage of the gasoline, may result in the formation of oxidized reaction products in the gasoline. It is readily apparent that the removal of the metal components is desirable in order to avoid such catalytic oxidation.

Other organic liquids contain metal components which likewise are preferably removed. These include edible fats and oils of animal, vegetable or mineral origin, lubricating oils, diesel fuels, fuel oils, photographic developers, etc., as well as greases, waxes, etc.

A particular advantage of the process of the present invention is that the metal components are removed from the organic liquid. In other processes a metal deactivator is incorporated in the organic liquid and this serves to deactivate the catalytic effect of the metal to catalyze oxidative reactions. However, the metal component remains in the organic liquid and may be undesirable, either because of possible decomposition of the resultant chelate and the concomitant liberation of the metal component, or because of the undesired effect which the metal chelate itself may have. In the process of the present invention the metal component is removed from the organic liquid and therefore cannot exert any undesired catalytic effect.

In one embodiment the present invention relates to a process for removing a metal component from an organic liquid containing the same, which comprises contacting said organic liquid with a solid polymer prepared by condensing a methylene-bis-salicylaldehyde with a polyaminoalkane.

In a specific embodiment the present invention relates to a process for removing copper from gasoline containing the same, which comprises contacting said gasoline with a solid polymer prepared by condensing methylene-bis-salicylaldehyde with ethylenediamine.

The methylene-bis-salicylaldehyde for reaction with the polyaminoalkane may be prepared in any suitable manner. The methylene-bis-salicylaldehyde may contain substituents attached to the rings and this, in turn, is determined by the salicylaldehyde used in preparing the methylene-bis-salicylaldehyde. When an unsubstituted methylene-bis-salicylaldehyde is desired, salicylaldehyde is used in preparing this compound. When the methylene-bis-salicylaldehyde contains one or more substituents attached to the rings, a substituted salicylaldehyde is used and may contain one or more substituents attached to the rings and preferably in the 3-position. The substituent may be selected from alkyl, alkenyl, aralkyl, aryl, alkaryl or cycloalkyl. Illustrative examples of substituted salicylaldehydes include 3-methylsalicylaldehyde, 3-ethylsalicylaldehyde, 3-propylsalicylaldehyde, 3-butylsalicylaldehyde, 3-amylsalicylaldehyde, 3-hexylsalicylaldehyde, 3-heptylsalicylaldehyde, 3-octylsalicylaldehyde, 3-nonylsalicylaldehyde, 3-decylsalicylaldehyde, etc., 3-allylsalicylaldehyde, 3-methallylsalicylaldehyde, 3-crotylsalicylaldehyde, 3-(2-pentenyl)-salicylaldehyde, etc., 3-phenylsalicylaldehyde, 3-tolylsalicylaldehydes, 3-xylylbenzaldehydes, etc., 3-benzylsalicylaldehyde, 3-phenethylsalicylaldehyde, etc., 3-cyclopentylbenzaldehyde, 3-cyclohexylbenzaldehyde, etc. As hereinbefore set forth, the substitution in the 3-position is preferred as in the compounds specifically recited above. It is understood that, in place of or in addition to the substitution in the 3-position, the salicylaldehyde may contain substitutions in the 4- and/or 6-positions, the substituent preferably being selected from those specifically set forth.

In one embodiment methylene-bis-salicylaldehyde is prepared by reacting the salicylaldehyde with formaldehyde or a compound which liberates formaldehyde under the conditions of reaction as, for example, trioxane. This reaction is readily effected in the presence of acetic acid and sulfuric acid at a temperature of from about 90° to 95° C. As will be noted, the salicylaldehyde and formaldehyde are reacted in equal molar proportions and accordingly these reactants are used in such quantities, although an excess of one reactant, and particularly the salicylaldehyde, may be present in the reaction zone.

In another method, methylene-bis-salicylaldehyde is prepared by reacting the salicylaldehyde with methylene chloride (dichloromethane) in the presence of a Friedel-Crafts type catalyst. Friedel-Crafts type catalysts include aluminum chloride, zirconium chloride, ferric chloride, zinc chloride, bismuth chloride, boron trifluoride, etc. The temperature of reaction will depend upon the particular catalyst used and will range from about —50° to about 100° C., although a higher temperature may be used in some cases. The lower temperature is used with the more active catalyst as, for example, when using aluminum chloride the temperature will range from about —20° to about +30° C. The pressure may range from atmospheric to 1000 pounds per square inch or more.

The methylene-bis-salicylaldehyde is then reacted with a polyaminoalkane. Any suitable polyaminoalkane may be used. 1,2-diaminopropane and 1,2-diaminoethane (ethylenediamine) are particularly preferred. Other diaminoalkanes include 1,2-diaminobutane, 1,3-diaminobutane, 1,4-diaminobutane, 1,2-diaminopentane, 1,3-diaminopentane, 1,4-diaminopentane, 1,5-diaminopentane, 1,2-diaminohexane, 1,3-diaminohexane, 1,4-diaminohexane, etc. Other polyaminoalkanes includes diethylenetriamine, triethylene tetramine, tetraethylenepentamine, etc., dipropylenetriamine, tripropylenetetramine, tetrapropylenepentamine, etc.

The reaction of methylene-bis-salicylaldehyde and polyaminoalkane is effected in any suitable manner. In one method the reaction is effected by admixing the required concentrations of the salicylaldehyde and polyaminoalkane and refluxing the mixture. The reaction product is a solid polymer and the methylene-bis-salicylaldehyde and polyaminoalkane preferably are reacted in equal molar proportions although, when desired, these may range from about 0.2 to about 10 and more particularly for about 0.5 to about 2 molar proportions of one reactant per one molar proportion of the other reactant. Generally it is preferred to effect the reaction in the presence of a solvent. In one method one or both of the reactants may be formed as a solution in the solvent and utilized in this manner. In another method the solvent may be introduced directly into the reaction zone. Any suitable solvent or mixtures thereof may be employed and may be selected from benzene, xylene, toluene, cumene, decalin, etc., alcohols, such as methanol, ethanol, propanol, butanol, etc., ethers, such as diethyl ether, diisopropyl ether, etc. Following the reaction, water, solvent and any unreacted constituents are removed in any suitable manner, including filtering, drying by heating at 100° to 200° C., preferably under vacuum in order to avoid decomposition of the reaction product, and/or washing with suitable reagents. In another method the reaction is effected in a zone provided with a water outlet so that the water formed during the reaction is continuously removed from the reaction zone. The solvent later is removed in either the same or different zone.

As hereinbefore set forth, the reaction is readily effected in the absence of a catalyst. However, in some cases it may be desired to utilize a catalyst. Any suitable catalyst may be used including those containing copper, chromium, vanadium, platinum, palladium, etc., preferably composited with a suitable carrier including alumina, silica, silica-alumina, magnesia, alumina-magnesia, silica-magnesia, silica-alumina-magnesia, zirconia or composites thereof, zinc chloride, etc. However, the use of a catalyst presents the additional problem of separating the solid polymer from the catalyst and accordingly it generally is preferred not to use the catalyst.

The solid polymer prepared in the above manner is utilized as such or, in another embodiment of the invention, it is composited with a suitable carrier. The carrier may be selected from alumina, silica, silica-alumina, magnesia, silica-magnesia, alumina-magnesia, silica-alumina-magnesia, zirconia, silica-zirconia, alumnia-zirconia, silica-alumina-zirconia, carbon, etc. The polymer may be composited with the support in any suitable manner. In one method, methylene-bis-salicylaldehyde or the polyaminoalkane is composited with the carrier in any suitable manner, and then the condensation with the other reactant is effected in order to form the polymer associated with the carrier in situ. The use of the polymer composited with a carrier offers the advantage of more efficient utilization of the polymer.

Removal of the metal components from organic liquids by contact with the solid polymer is effected in any suitable manner. In a preferred embodiment the solid polymer, either as such or composited with a carrier, is disposed as a fixed bed in a reaction zone, and the organic liquid containing metal components is passed therethrough, at the desired temperature and pressure and either in upward or downward flow. The treatment is readily effected at ambient temperature, although elevated temperatures may be employed, which generally will not exceed about 100° C. Atmospheric pressure may be employed but generally a slightly superatmospheric pressure up to 50 pounds per square inch is used, although higher pressures up to 2000 pounds or more may be employed when desired. In other methods of operation, the solid polymer or composite thereof with a carrier is used as a moving bed passing in countercurrent contact with a stream, generally an ascending stream, of the organic liquid to be treated. In still another method, the solid polymer or composite thereof is passed as a slurry in the organic liquid into a recation zone, following which the catalyst is removed from the organic liquid by filtering or otherwise.

It is believed that the solid polymer of the present invention serves to remove metal components by forming a chelate thereof. The chelate is retained in the solid polymer and is thereby removed from the organic liquid. However, it is understood that applicants do not intend to be limited to this mechanism. As another advantage the process of the present invention effectively removes metals which normally are not deactivated when a conventional metal deactivator is incorporated in the organic liquid. For example, the conventional metal deactivator generally will deactivate copper but is not very satisfactory for deactivating cobalt. However, as will be shown by the examples appended to the present specifications, both copper and cobalt are substantially removed from the organic liquid. Accordingly, it is seen that the process of the present invention serves to remove metal components from organic liquids and thereby to improve the organic liquid during subsequent transportation, storage and/or use.

The following examples are introduced to illustrate further the novelty and utility of the present invention but not with the intention of unduly limiting the same.

EXAMPLE I

A solid polymer was formed by the condensation of methylene-bis-salicylaldehyde and ethylenediamine in the following manner. 200 grams of salicylaldehyde, 17.5 grams of trioxide and 125 ml. of acetic acid were heated and stirred under nitrogen pressure at 90°–95° C. for 27 hours. 1.25 ml. of concentrated sulfuric acid in 6.25 ml. of acetic acid were added drop-wise during the first 7 hours. At the end of the reaction time the mixture was poured into ice water and allowed to stand overnight. The water was filtered off and the residue was washed first with petroleum ether and then twice with ethyl ether. 60 grams of a white powder, melting at 137°–140° C. were recovered as 5,5'-methylene-bis-salicylaldehyde.

The 5,5'-methylene-bis-salicylaldehyde prepared in the above manner was reacted with ethylenediamine. 10 grams of the methylene-bis-salicylaldehyde and 2.34 grams of ethylenediamine previously dissolved in 300 ml. of benzene were refluxed for 3½ hours in the presence of 10 grams of a platinum-containing catalyst. The polymer was recovered as a yellow powder in 60% yield. It had a melting point in excess of 240° C., a basic nitrogen equivalent weight of 142 (141 being theoretical), and a nitrogen content of 10.56%. The solid polymer was insoluble in acetone, ether, toluene, methanol, dimethylformamide or tetrahydrofuran.

EXAMPLE II

The solid polymer prepared in accordance with Example I was utilized to remove copper from gasoline. Sufficient copper was added to the gasoline to give it a content of 0.683 mg. copper per liter. 540 grams of the gasoline containing copper were shaken at room temperature for 1½ hours with 0.1 gram of the solid polymer prepared in accordance with Example I. The polymer was removed by filtering and the treated gasoline was analyzed and found to contain 0.06 mg. of copper per liter, equivalent to a 91% reduction in the copper content of the gasoline.

EXAMPLE III

Another solid polymer was prepared in the same manner as described in Example I except that this preparation was made in the absence of a catalyst. The product corresponds to the product obtained in Example I.

The solid polymer prepared in the above manner was used in the treatment of another sample of the gasoline described in Example I except that this sample of gasoline contained 0.701 mg. of copper per liter and about 0.38 part per million of cobalt. The gasoline was treated by passing 700 ml. thereof in upward flow through an 80 ml. column packed with the solid polymer, at a liquid hourly space velocity (volumes of gasoline per volume of polymer per hour) of 1.4.

The copper content of the gasoline was reduced by the above treatment from 0.701 to 0.022 mg. per liter, equivalent to a 97% removal. The cobalt was reduced from about 0.38 to 0.04 part per million, equivalent to about 89% removal.

From the above data, it will be seen that the process of the present invention is very effective in removing metal components from the gasoline.

EXAMPLE IV

In this example the solid polymer prepared in accordance with Example II is composited with activated alumina. The alumina is prepared as 1/16" pellets. Methylene-bis-salicylaldehyde is heated to a temperature of 150° C. and the pellets are soaked therein. The pellets containing the methylene-bis-salicylaldehyde then are placed in a reaction zone together with the required amount of ethylenediamine. The mixture then is heated to 125° C. to form the polymer in situ on the alumina.

The polymer composite prepared in the above manner is used as packing material for the removal of metal components from diesel fuel by passing the diesel fuel through a bed of the polymer composite at a temperature of 30° C. and a pressure of 100 pounds per square inch.

EXAMPLE V

The solid polymer of this example is prepared by first reacting 3-methylsalicylaldehyde with methylene chloride to form methylene-bis-3-methylsalicylaldehyde and then reacting the last-named compound with 1,2-diaminopropane. Two molar proportions of 3-methyl-salicylaldehyde are reacted at 15° C. with one molar proportion of methylene chloride using aluminum chloride catalyst. The resultant methylene-bis-3-methylsalicylaldehyde is reacted with 1,2-diaminopropane in substantially the same manner as heretofore set forth.

The solid polymer prepared in the above manner is utilized as a fixed bed in a reaction zone, and lard containing copper is passed therethrough at a temperature of 60° C. This serves to remove metal components from the lard and thereby improves the stability period of lard. In other words, the lard may be stored for longer periods of time without undergoing rancidity than occurs when using lard containing metal components.

We claim as our invention:

1. A process for removing a metal component from an organic liquid containing the same, which comprises contacting said organic liquid with a solid polymer prepared by condensing a methylene-bis-salicylaldehyde with a polyaminoalkane.

2. A process for removing a metal component from a hydrocarbon distillate containing the same, which comprises contacting said hydrocarbon distillate with a solid polymer prepared by condensing methylene-bis-salicylaldehyde with a diaminoalkane.

3. A process for removing a metal component from gasoline containing the same, which comprises passing said gasoline through a bed of solid polymer prepared by condensing methylene-bis-salicylaldehyde with ethylenediamine.

4. A process for removing a metal component from gasoline containing the same, which comprises passing said gasoline through a bed of solid polymer prepared by condensing methylene-bis-salicylaldehyde with 1,2-diaminopropane.

References Cited in the file of this patent

UNITED STATES PATENTS

| | | |
|---|---|---|
| 2,411,959 | Dietrich et al. | Dec. 3, 1946 |
| 2,470,887 | Chenicek | May 24, 1949 |
| 2,870,123 | Wesp | Jan. 20, 1959 |
| 2,903,483 | Berres | Sept. 8, 1959 |
| 2,918,497 | Walter | Dec. 22, 1959 |
| 2,935,493 | Schuller et al. | May 3, 1960 |